United States Patent [19]

Brennan

[11] Patent Number: 4,560,859
[45] Date of Patent: Dec. 24, 1985

[54] DISH FOR USE WITH MEAL TRAY FEEDING SYSTEM WHICH USES HEATER SHELVES TO LIFT DISHES

[75] Inventor: Edward J. Brennan, Litchfield, Conn.

[73] Assignee: PTC Aerospace Inc., Bantam, Conn.

[21] Appl. No.: 640,052

[22] Filed: Aug. 10, 1984

[51] Int. Cl.$^4$ .............................................. H05B 1/00
[52] U.S. Cl. .................................... 219/386; 219/521; 165/919
[58] Field of Search ............... 219/385, 386, 387, 521; 165/DIG. 25, DIG. 26; 126/246, 268, 261; 312/236; 34/192, 194, 195, 197

[56] References Cited

U.S. PATENT DOCUMENTS

| 4,019,022 | 4/1977 | Seider | 219/521 |
| 4,041,277 | 8/1977 | Shumrak | 219/521 |
| 4,103,736 | 8/1978 | Colato | 165/DIG. 26 |
| 4,346,756 | 8/1982 | Dodd et al. | 165/48 R |

Primary Examiner—C. L. Albritton
Assistant Examiner—Teresa J. Walberg
Attorney, Agent, or Firm—Thomas K. McBride; William H. Page, II; Barry L. Clark

[57] ABSTRACT

Dish for use with meal tray feeding system in which dish is lifted for heating by a heater shelf slid between the dish and the tray has improved retention to resist being jostled out of contact with heater. Two parallel runners on the dish bottom have downwardly extending foot portions at their ends which greatly enhance the retention of the dish relative to both a pair of guide rib portions on the tray and the heater shelf. The heater shelf is mounted by a bracket to the side wall of a cart within which the heater shelves are mounted and the foot portions straddle the bracket.

3 Claims, 7 Drawing Figures

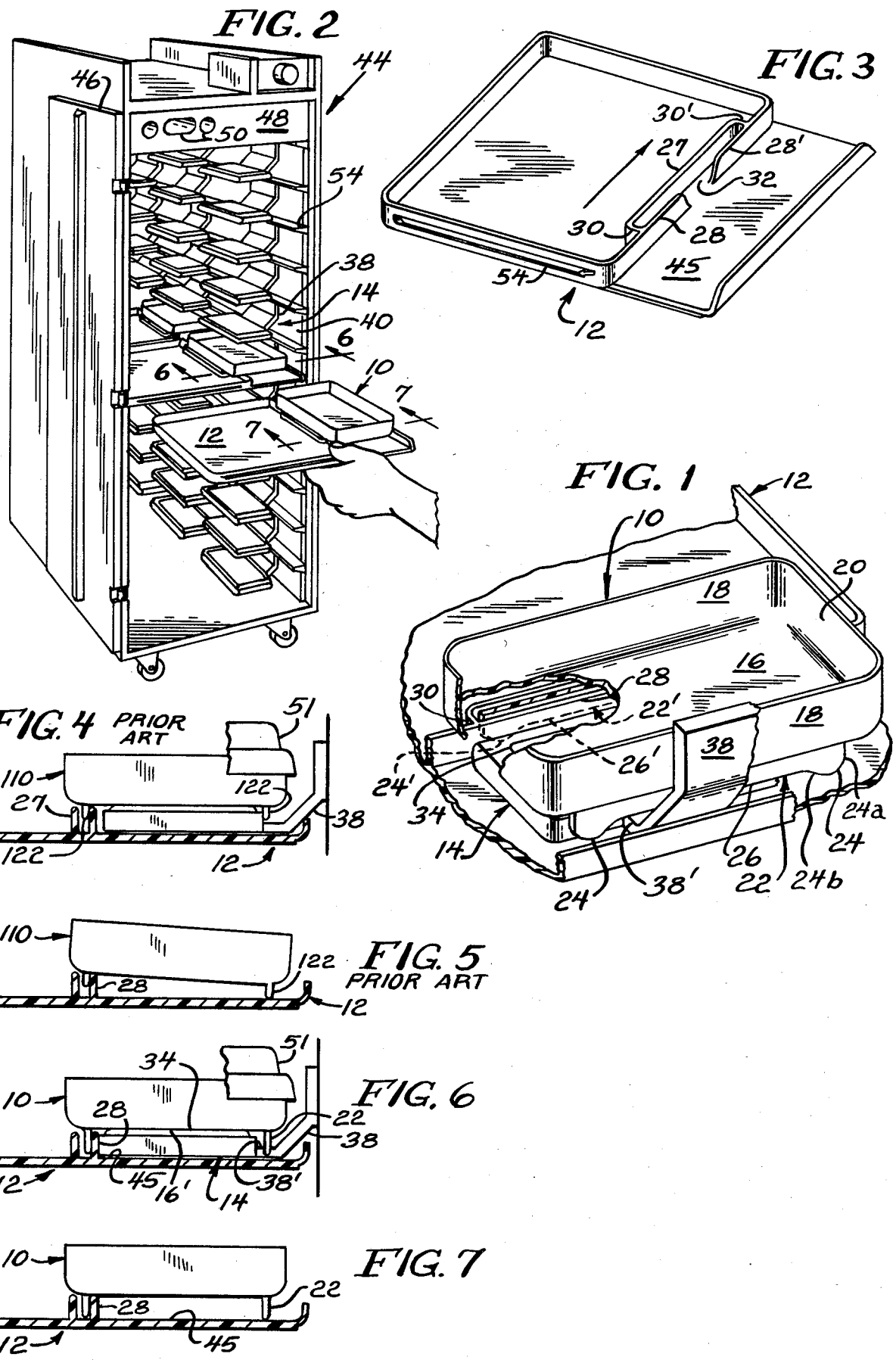

DISH FOR USE WITH MEAL TRAY FEEDING SYSTEM WHICH USES HEATER SHELVES TO LIFT DISHES

BACKGROUND OF THE INVENTION

The invention relates to feeding systems for use in aircraft or hospitals, for example, which can heat a food dish while the dish is on a tray in a tray cart. More particularly, it relates to such a feeding system wherein a plurality of heater shelves, which are mounted in the cart, are adapted to be slidingly engaged by dishes which are passed over them while the trays pass under them and while the dishes are retained against movement relative to the trays. An example of such a feeding system is disclosed in Dodd et al., U.S. Pat. No. 4,346,756 which is assigned to a common assignee, and whose disclosure is incorporated by reference herein. In the Dodd et al. patent, the dishes to be heated are disclosed as having a pair of integral parallel runner portions. One of the runner portions is retained between a pair of parallel, vertically extending guide rib means on the tray which captures it both when the dish is on the tray and outside the cart or when it is in the cart and raised up by the heater. The other runner portion is adapted to contact the bottom of the tray when the tray is out of the cart. When the tray is in the cart, the said other runner portion rests on the top of a bracket which supports the heater shelf in a cantilever fashion from the wall of the cart. In order to minimize weight and space requirements and maximize the number of trays and meals which can be stored and heated in a single cart, the vertical extent of the runner portions has been kept relatively low, about 0.28 inches. In the usual operating situation, the existing dishes and trays have cooperated in their intended manner quite satisfactorily. However, when the cart containing the loaded trays is in transit from a commissary to an aircraft and the truck carrying it is subjected to rather violent bumps, it is sometimes possible for one dish runner to be lifted up from between the pair of guide ribs which guide it. In such a situation, the runner could also move longitudinally and land on top of one of the two transverse abutment means which normally engage the ends of the runner and restrain the dish in a fixed position over a heater shelf element. Thus, it would be possible for further jostling movement to cause the dish bottom to slide at least partially off the heater shelf, and thus out of the full surface engagement which is needed for rapid efficient heating. This is especially true since the other dish runner is free to slide over the bracket that supports the heater shelf. In such an instance, the dish would not get properly heated unless the cart was opened and visually inspected very carefully when it reached the aircraft to detect and correct any shifting of dishes. It would also be conceivably possible for a dish to jump out of its guide track if the tray on which it was positioned had become considerably warped after a number of heating and washing cycles.

SUMMARY OF THE INVENTION

It is among the objects of the present invention to provide an improved dish for a tray feeding system of the type described which will provide substantially greater retention of a heated dish relative to a tray when it is jostled during transit, while still maintaining the same vertical dimension above the dish inner surface as existed for dishes of the type disclosed in Dodd et al., U.S. Pat. No. 4,346,756.

A further object of the invention is to provide a dish which will have a secondary retention means which can prevent longitudinal movement relative to the heater shelf even when one runner on the dish is lifted high enough to be moved above the transverse element that normally retains it.

These and other objects are attained by the improved dish of the present invention which incorporates a pair of integral and parallel guide runner portions. Preferably, in the interest of maintaining symmetry, and allowing the dish to be more easily assembled to the tray, the runners at the front and back edges of the dish are identical. Each end of each runner should have an extended vertical height which can function as a support foot for the dish when it is out of the tray cart. The intermediate portions, if any, of each runner between the feet on its ends must not extend downwardly as far as the end foot portions. Also, in order to provide a tolerance assuring good heater to dish contact, such intermediate portions should terminate short of contacting the heater shelf support bracket when the dish is on a tray and in operative contact with a heater shelf. In the operative position, the end support foot portions of one runner straddle the spaced-apart side edges of the heater shelf support bracket. Thus, they are able to prevent longitudinal movement of the dish relative to the heater shelf, even if the other runner should be jostled upwardly sufficiently as to lift one of its end support foot portions higher than the transverse abutment which would normally constrain it. Conversely, if the feet on the heater shelf bracket side of the dish are lifted higher than the bracket, the other feet will, in most cases, continue to be retained by the transverse abutments on the tray. Obviously, if the dish should receive a longitudinal jolt and simultaneously have both of the feet on one end lifted, it could come out of contact with the heater shelf. However, it is quite unlikely for this to happen.

BRIEF DESCRIPTION OF THE DRAWINGS

FIG. 1 is a perspective view illustrating the double retention feature between the dish and the tray and between the dish and the heater shelf bracket;

FIG. 2 is a perspective view of a food service cart illustrating the general relationships between the cart, the trays, and the dishes;

FIG. 3 is a perspective view of a tray;

FIG. 4 is an end sectional view similar to FIG. 6 but illustrating the relatively small degree of retention possible with prior art dishes;

FIG. 5 is an end sectional view similar to FIG. 7 but illustrating the tilted orientation assumed by the prior art dishes when the trays are removed from the cart for serving;

FIG. 6 is a partial cross-section of a dish and tray taken on line 6—6 of FIG. 2, with the dish in its operative heating position; and FIG. 7 is a partial cross-section of a dish and tray taken on line 7—7 of FIG. 2, with the dish in its serving position.

DETAILED DESCRIPTION OF THE DRAWINGS

FIG. 1 illustrates the relationship of the improved dish 10 of the present invention to a tray indicated generally at 12 and to a heater shelf indicated generally at 14. The dish 10 has an inner bottom surface 16, identical front and back walls 18, identical side walls 20, and a pair of identical, integral parallel rib or runner portions indicated generally at 22, 22'. Each of the runners has an extended foot portion 24, 24' at each of its ends and an intermediate portion 26, 26' which helps strengthen it and retains heat. The tray 12 has a pair of parallel, closely spaced guide rib portions 27 and 28, 28' which are joined by transverse abutment portions 30, 30' to define a recess 32 which is intended to capture the rear runner portion 22'. The heater shelf 14 includes a longitudinally extending heater pad portion 34 which, during heating, must be firmly and completely contacted by the underneath flat bottom surface 16' of the dish 10, as shown in FIG. 6. An angled bracket 38 is provided for mounting, preferably by screws (not shown), the heater shelf 14 to the vertical side wall 40 of a service cart 44 (FIG. 2), so that the heater pad 34 will be horizontal. The bracket 38 has a longitudinal dimension which must be no greater than the longitudinal dimension of the intermediate portion 26 of dish runner 22. Furthermore, the intermediate portion 26 has a maximum vertical dimension that is insufficient to touch the horizontal surface 38' of the bracket when the dish is in its FIG. 1 or FIG. 6 heating position. Thus, a slight clearance is provided above the surface 38' to insure good contact between the dish and heater pad. Similarly, the maximum vertical dimension of the feet 24, 24' must be insufficient to contact the flat upper surface 45 of the tray 12 when the dish is in its FIG. 1 or FIG. 6 heating position. The aforementioned clearances are illustrated in FIG. 6, and must obviously allow for manufacturing tolerances. The feet 24, 24' must have a sufficient vertical extent to insure that the feet 24 will continue to straddle bracket surface 38', and thus be restrained against longitudinal movement, in the event that the dish gets a jolt in a vertical and longitudinal direction that tends to lift one of the feet 24' higher than and on top of an adjacent transverse abutment 30. If any portion of the rib 22' is allowed to jump out of the recess 32 and rest on top of an abutment 30 the dish would lose effective heating contact with the heater pad 34. However, such motion is protected against by two mechanisms. Principally, the entire difference in vertical dimension between the intermediate rib portion 26' and the feet 24' provides a corresponding additional degree of overlap between the rib 22' and the tray ribs 27, 28 and 30 which is not provided by the prior art dish shown in FIG. 4. This improvement in overlap is readily obvious by comparing FIGS. 4 and 6. Secondarily, even if one of the feet 24' is jolted higher than the ribs 27, 28 and 30, the chances would generally be good that rib 22 would remain sufficiently far down that one of the feet 24 would engage a side edge of the bracket 38 and thus prevent longitudinal movement.

FIG. 2 illustrates a cart 44 of the type typically used to heat food placed in the dishes 10. The operation of the food system is explained in detail in the aforementioned Dodd et al. U.S. Pat. No. 4,346,756. Briefly, however, the cart is preferably filled with two or three of the trays 12 per shelf and the doors 46 are then closed. The cart then defines a closed compartment which may be continually chilled by mechanical means (not shown) or by dry ice contained in a chiller tray 48 having openings 50 which permit the $CO_2$ vapor to fall down the inside wall of one of the doors 46. A small blower (not shown) at the opposite end of the chiller tray 48 draws the chilled air across the trays, thereby warming it, and then draws it up along the other end door and recirculates it across the dry ice. The cooling goes on constantly while the heater shelves 14 are preferably only activated about 30 minutes prior to a desired serving time. The dishes 10 are covered by covers 51, which have been omitted for clarity except in FIG. 6, to preserve their heat and reduce the load on the chilling system. As a tray is manually inserted into the cart 44, it will be guided by shelves 54 so that the heater shelves 14 will pass just above its flat upper surface 45 and cooperate with the dishes 10 which pass over them to lift the dishes and cause their lower surfaces 16' to be contacted by the heater pads 34. Each dish will remain in place on the tray as it is engaged by a heater shelf since the transverse abutment 30 on the tray will engage one end of the runner 22'. The feet 24, 24' have curved leading and trailing corner portions, as seen at 24a, 24b in FIG. 1, so that the dish will be rather gently lifted and lowered as the feet contact and leave the upper surface 38' of the heater shelf bracket 38. The curved corners would also assist in returning the dish to its retained position if jostling caused it to start to climb over abutment 30 or support surface 38'.

FIG. 3 illustrates a tray of a design which is suitable for use with the dish 10 and heater shelf 14 previously described. Although most of the portions of the tray have been previously described, it might be noted that it is desirable to maintain an open area between rib portions 28, 28' to make it easier for any food particles that might enter the recess 32 during a tray washing operation to be rinsed away. The small, arrow cross-sectioned fins 54 may be provided on opposed sides of the tray so that the operation of pulling out one tray from the cart can cause the adjacent tray in the center of the cart to be moved into a more accessible position at the end of the cart.

FIGS. 4–7 permit a comparison of the improved dish 10 of FIGS. 1, 6 and 7 to the previously described prior art dish which is generally indicated at 110. The runners 122 of the dish 110 have to be quite low in height, usually about 0.028", since the two dish runners must preferably be symmetrical and must, to insure proper heater contact, also provide clearance above the bracket surface 38' and above the ribs 28. From their sides which are normal to the side shown in FIGS. 4 and 5, they would have a shape corresponding to that which dish 10 would have if its runner portions 26, 26' were extended to the end of runners 22, 22' and there were no foot portions 24, 24'. Besides offering relatively little overlap with the ribs 27, 28, the low height runners 122 also cause the dish to be slightly tilted in its FIG. 5 serving position. This tilted position is not too esthetically pleasing and could also slightly reduce the capacity of the dish for holding liquids. As can be seen in comparing FIG. 6 to FIG. 4, the improved dish 10 provides significantly increased retention overlap with the tray ribs 27, 28 and 30. Also, as can be seen by comparing FIG. 7 to FIG. 5, the dish 10 is horizontal in its serving position.

FIGS. 4 and 6 illustrate the need to space the runners 22, 22' at a distance apart that will allow a substantial amount of variation in the path traveled by the tray 12 as it is slid in or out of the cart 44, thus making it easier to load or remove trays. For example, in FIG. 4, the tray is in its leftmost position engaging the rear surface of bracket 38. In FIG. 6, the tray is in its rightmost position where rib 28 abuts the left edge of heater shelf 14.

Although the addition of extension feet 24, 24' to the runners 22, 22' increases the amount of retention overlap with the recess 32 by a small dimension of only about 0.16", the percentage of useful overlap is almost doubled. Furthermore, the increased retention is obtained without any decrease whatsoever in the dimension between the bottom surface 16 of a dish on one tray in the cart 44 and the bottom of the tray positioned above it. Maintaining the latter dimension is quite important in order to maximize the number of meals a cart will hold, minimize the number of carts needed on an aircraft, and to allow the carts to fit into established space envelopes.

I claim as my invention:

1. A rectangular dish having a generally flat bottom surface portion, said dish being adapted for use with a meal tray feeding system which incorporates a thin heater shelf having a cantilevered, generally horizontally extending support portion and a heater pad portion which is adapted to heat the said generally flat bottom surface portion of the dish, and a tray having at least two closely spaced sets of parallel, aligned, upstanding rib portions, said tray further having a pair of spaced apart transverse portions, said transverse portions cooperating with portions of each of said spaced sets of rib portions which are most remote from each other to retain the dish against longitudinal movement relative to the tray, said dish being characterized in that it has a pair of longitudinally extending, parallel runner portions integral with, and extending downwardly from said generally flat bottom surface, each of said pair of runner portions having end portions and an intermediate portion and having its maximum vertical extent at said end portions thereof, thereby defining a pair of foot portions for said dish, the said intermediate portion, which comprises the major portion of the length of each of said runner portions between said pair of foot portions, being of lesser vertical extent, said major portion of the length of said runner portions being at least equal in length to the longitudinal extent of an upper surface of said generally horizontally extending cantilevered support portion of a heater shelf with which the dish is adapted to be used, and which one of the runners of said dish is adapted to overlie when the dish is being heated.

2. A dish according to claim 1 wherein said major portion and said foot portions of said runner portions are sized, so that when the generally flat bottom surface portion of said dish is in operative contact with a heater pad portion of a heater shelf, said foot portions and said major runner portion will extend to locations relative to an upper surface of said generally horizontally extending cantilevered support portion of said heater shelf which said one dish runner overlies, which, respectively, are lower and higher than said upper surface.

3. A dish according to claim 2 wherein said foot portions have curved lead-in and lead-out portions on their lower corners which, when on the dish runner which overlies said cantilevered support portion, will contact said cantilevered support portion and cooperate with it to lift or lower said dish relative to said heater shelf as a tray carrying said dish is moved relative to said heater shelf.

* * * * *